(12) United States Patent
Ikuta

(10) Patent No.: US 8,882,568 B2
(45) Date of Patent: Nov. 11, 2014

(54) IMPACT ABSORBING MECHANISM OF GEAR TRAIN

(75) Inventor: Hiroki Ikuta, Anjo (JP)

(73) Assignee: Makita Corporation, Aichi (JP)

( * ) Notice: Subject to any disclaimer, the term of this patent is extended or adjusted under 35 U.S.C. 154(b) by 429 days.

(21) Appl. No.: 13/503,170

(22) PCT Filed: Oct. 6, 2010

(86) PCT No.: PCT/JP2010/067536
§ 371 (c)(1),
(2), (4) Date: May 8, 2012

(87) PCT Pub. No.: WO2011/048950
PCT Pub. Date: Apr. 28, 2011

(65) Prior Publication Data
US 2012/0227527 A1    Sep. 13, 2012

(30) Foreign Application Priority Data

Oct. 23, 2009  (JP) ................................ 2009-244118
Aug. 3, 2010   (JP) ................................ 2010-174541

(51) Int. Cl.
    B24B 47/12    (2006.01)
    B24B 23/02    (2006.01)
    B24B 47/28    (2006.01)
    B23Q 5/56     (2006.01)

(52) U.S. Cl.
    CPC ............. *B24B 23/028* (2013.01); *B24B 47/28* (2013.01); *B23Q 5/56* (2013.01); *B24B 47/12* (2013.01)
    USPC .......................................... 451/359; 451/294

(58) Field of Classification Search
    CPC .......... B24B 47/12; B24B 47/28; B24B 23/28

USPC ........................................................ 451/359
See application file for complete search history.

(56) References Cited

U.S. PATENT DOCUMENTS

| 2,412,199 A | * | 12/1946 | Blood ........................... 451/441 |
| 5,586,467 A | * | 12/1996 | Weber ............................. 74/57 |
| 2004/0180746 A1 | * | 9/2004 | Hasegawa et al. ................. 475/2 |
| 2005/0041996 A1 | * | 2/2005 | Kishigami ..................... 399/227 |
| 2006/0084370 A1 | * | 4/2006 | Robieu et al. ................. 451/359 |

FOREIGN PATENT DOCUMENTS

| JP | A-2006-130591 | 5/2006 |
| JP | A-2006-181667 | 7/2006 |
| JP | A-2007-275999 | 10/2007 |

OTHER PUBLICATIONS

International Search Report issued in International Application No. PCT/JP2010/067536 dated Dec. 21, 2010.

* cited by examiner

*Primary Examiner* — Maurina Rachuba
(74) *Attorney, Agent, or Firm* — Oliff PLC

(57) ABSTRACT

An impact absorbing mechanism for absorbing impact generated upon meshing of gears by starting or stopping an electric motor, for example, in a speed reduction gear train of a disk grinder, has the problem that its ease of manufacture and the durability are lowered because small elastic components are located between a driven gear and a driven shaft when an impact absorbing action occurs in the rotational direction in the related art. The present invention is aimed to improve the ease of manufacture and the durability of the impact absorbing mechanism. It is configured to absorb impact by displacing steel balls in a diameter expanding direction by relative rotation of a driven gear and a driven shaft due to rotational power generated upon meshing and by displacing an axial displacement member in an axial direction against an axial elastic member.

11 Claims, 11 Drawing Sheets

IMPACT ABSORBING MECHANISM OF GEAR TRAIN

Embodiments of the present invention relates to an impact absorbing mechanism of a gear train that reduces the rotational power of an electric motor and transmits the rotational power to a spindle in, for example, an electric tool such as a disk grinder.

DESCRIPTION OF THE RELATED ART

A disk grinder typically includes a speed reduction gear train provided in a front portion of a body housing having an electric motor disposed therein. Rotational power of the electric motor is output to a spindle through a gear train through a meshing interaction between a driving-side bevel gear (a pinion gear) mounted to an output shaft and a driven-side bevel gear (a driven gear). For this reason, in general, the output shaft of the electric motor and the spindle are arranged such that their axes intersect each other. A threaded shaft portion is provided at the front end portion of the spindle. A whetstone may be mounted to the spindle by attaching the whetstone to the threaded shaft portion and fastening a fixing nut. When the fixing nut is loosened, the whetstone may be removed from the spindle for the purpose of replacement or the like.

When the electric motor is started or in particular when the electric motor with a brake is stopped, it is likely that impact or abnormal sound may be generated upon meshing of the gear train. Further, it is likely that the fixing nut fixing the whetstone to the spindle may be loosened due to the inertia torque of the whetstone generated when the brake is operated. For this reason, efforts have been made for reducing the impact, the inertia torque, or the like (hereinafter, simply referred to as impact).

SUMMARY OF THE INVENTION

In a first embodiment, there is provided an impact absorbing mechanism of a gear train that transmits rotational power of a driving shaft to a driven shaft. The gear train includes a drive gear on the side of the driving shaft and a driven gear on the side of the driven shaft, which mesh with each other. A radial displacement member, an axial displacement member and an axial elastic member preferably exist in a rotational power transmission path between the driven gear and the driven shaft. The radial displacement member can be supported by the driven gear so as to be displaceable in a radial direction. The axial displacement member may be displaced in an axial direction by the displacement of the radial displacement member in a diameter expanding direction. The axial elastic member performs an impact absorbing action with respect to the displacement of the axial displacement member in the axial direction. The axial displacement member may be displaced in the axial direction by the rotation of the driven gear relative to the driven shaft, so that impact generated upon meshing between the drive gear and the driven gear is absorbed.

In the first embodiment, the drive gear and the driven gear mesh with each other to generate rotational power. The driven gear rotates relative to the driven shaft, and hence the radial displacement member is displaced in the diameter expanding direction so that the axial displacement member is displaced in the axial direction. The axial displacement member is displaced in the axial direction against the biasing force of the axial elastic member, whereby impact generated by meshing between the drive gear and the driven gear is absorbed. In this way, the rotation of the driven gear relative to the driven shaft is converted into the displacement of the axial displacement member in the axial direction via the radial displacement member, so that impact generated by the meshing operation is absorbed by using a single axial elastic member. In this way it is possible to configure an input absorbing mechanism without the need for a plurality of elastic members positioned between the driven gear and the spindle.

An axial elastic member, for absorbing the impact of the axial displacement member in the axial direction, may be positioned at the axial end surface of the axial displacement member. An annular (ring-shaped) or C-shaped elastic member along the periphery of the driven shaft may be used.

It is possible to appropriately set the displacement amount of the diameter-expanding-direction displacement member and the displacement amount of the axial displacement member by the inclination angles of the first inclined surface and the second inclined surface. As the elastic force (spring constant) of the axial elastic member may be set so as to obtain a sufficient impact absorbing function without causing an increase in the diameter of the driven gear, it is possible to improve a degree of freedom in the setting of the gear ratio of the driven gear with respect to the drive gear.

In a second embodiment, the radial displacement member may be engaged with a first inclined surface provided on the driven shaft and a second inclined surface provided on the axial displacement member. In this way, the radial displacement member is displaced in the radial direction by the displacement of the radial displacement member about the axis relative to the first inclined surface in association with rotation of the driven gear relative to the driven shaft. Further, the axial displacement member may be displaced in the axial direction by the radial displacement of the radial displacement member relative to the second inclined surface in association with the radial displacement.

It may be possible to convert the relative rotation of the driven gear and the driven shaft into the displacement of the axial displacement member in the axial direction. This could be accomplished by providing a groove portion with a V-shaped cross-section along the axial direction as the first inclined surface on the driven shaft, providing the second inclined surface that has, for example, a tapered shape at the open end of the inner periphery of the axial displacement member, and having a radial displacement member held between both inclined surfaces.

In a third embodiment, a steel ball supported by the driven gear so as to be displaceable in the radial direction may be provided as the radial displacement member. The steel ball may be held between a first inclined surface and a second inclined surface. In this way, the steel ball may be displaced in the radial direction by the rotation of the driven gear relative to the driven shaft and the axial displacement member may be displaced in the axial direction.

One steel ball or a plurality of steel balls may be provided as the radial displacement member, with the steel ball(s) interposed between the first inclined surface and the second inclined surface.

In a fourth embodiment, an intermediate roller may be positioned between the steel ball and the first inclined surface so as to engage with the first inclined surface in a line-contact relationship. In this manner, the steel ball may indirectly engage with the first inclined surface. The steel ball may be displaced in the radial direction by the radial displacement of the intermediate roller so that the axial displacement member is displaced in the axial direction.

In a fourth embodiment, the steel ball indirectly engages with the first inclined surface via the intermediate roller so as to be held between the first inclined surface and the second inclined surface. The steel ball may not directly engage the first inclined surface, but instead, the intermediate roller may engage with the first inclined surface in a line-contact relationship therewith. Compared to the configuration in which the steel ball engages in a point-contact relationship this results in a more distributed stress distribution. Since the concentration of stress generated at the first inclined surface is reduced, abrasion of the first inclined surface is reduced, and hence the durability of impact absorbing mechanism may be improved.

In a fifth embodiment, the driven gear can be biased in a direction by a biasing force of the axial elastic member applied via the axial displacement member such that the drive gear meshes deeply with the driven gear.

Since the engaging condition of the drive gear with the driven gear is always maintained at an appropriate depth, it is possible to reduce the impact generated by meshing of the gears when the electric motor is started.

In a sixth embodiment, a single elastic member having an annular shape may be used as the axial elastic member.

A seventh embodiment may include a drive gear rotated by an electric motor, a bevel gear that serves as the driven gear with which the drive gear meshes, and a spindle serving as the driven shaft and supporting the bevel gear, wherein a circular whetstone is provided on the spindle. A steel ball serving as the radial displacement member may be interposed in the rotational power transmission path between the bevel gear and the spindle, so that the axial elastic member can be operated with respect to the axial displacement of the axial displacement member. It would operate in coordination with the displacement of the steel ball in the diameter expanding direction, thereby absorbing impact generated upon meshing between the drive gear and the bevel gear when starting or stopping the electric motor.

In an eighth embodiment, a drive gear on the side of the driving shaft and a driven gear on the side of the driven-shaft which mesh with each other. In a rotational power transmission path between the driven gear and the driven shaft, there is provided a radial displacement member that is supported by the driven gear so as to be displaceable in a radial direction. Also, a radial elastic member that performs an impact absorbing action with respect to the displacement of the radial displacement member in the diameter expanding direction. The radial displacement member may be displaced in the diameter expanding direction by the rotation of the driven gear relative to the driven shaft, so that impact generated upon meshing between the drive gear and the driven gear may be absorbed.

The drive gear and the driven gear mesh with each other such that a relative rotation may be generated between the driven gear and the driven shaft. Hence the radial displacement member may be displaced in the diameter expanding direction. Then, the radial elastic member can be operated with respect to the displacement so as to absorb impact. In this way, impact may be absorbed by the conversion of the rotation of the driven gear relative to the driven shaft into the displacement of the radial displacement member in the diameter expanding direction.

The radial elastic member that absorbs impact of the radial displacement member in the diameter expanding direction is not required to be placed between the driven gear and the driven shaft as in the rotation-direction elastic member of the related art, but instead, it is only necessary that the radial elastic member is placed on the outer peripheral side (the diameter expanding side) of the radial displacement member, and therefore, it is possible to use, for example, an annular (ring-shaped) or C-shaped elastic member along the outer peripheral side of the boss portion of the driven gear which holds the radial displacement member, and therefore, a sufficient impact absorbing ability may be produced using a single elastic member which is larger than in the related art.

In a ninth embodiment, an inclined surface may be provided on the side of the driven gear or the side of the driven shaft. The radial displacement member may be engaged with the inclined surface so that the radial displacement member is displaced in the diameter expanding direction by the rotation of the driven gear relative to the driven shaft.

In the ninth embodiment, may also possible to convert the relative rotation of the driven gear and the driven shaft into the displacement of the radial displacement member in the diameter expanding direction. This can be accomplished, for example, by providing a groove portion along the axial direction as the first inclined surface on the driven shaft such that the radial displacement member engages the inclined surface of the groove portion.

In a tenth embodiment, a roller serving as the radial displacement member may be engaged with the inclined surface on the side of the driven shaft. A C-shaped radial elastic member may also be displaced in the diameter expanding direction with respect to the displacement of the roller in the diameter expanding direction so as to create an impact absorbing action.

One steel ball or a plurality of steel balls may be provided as the radial displacement member, and the steel ball(s) may be fitted into the groove portion (the inclined surface) of the driven shaft. The C-shaped radial elastic member may be disposed at the periphery of the steel ball(s), and therefore, it may be possible to displace the radial displacement member in the diameter expanding direction thereby providing impact absorption.

In an eleventh embodiment, a bevel gear may serve as the driven gear with which the drive gear meshes. Further, a spindle serving as the driven shaft and supporting the bevel gear, wherein a circular whetstone is provided on the spindle may be included. Also, a roller serving as the radial displacement member may be positioned in the rotational power transmission path between the bevel gear and the spindle. In this way, the radial elastic member may be operated with respect to the displacement of the roller in the diameter expanding direction, thereby absorbing impact generated upon meshing between the drive gear and the bevel gear when starting or stopping the electric motor.

DETAILED DESCRIPTION OF THE INVENTION

Figure 1:
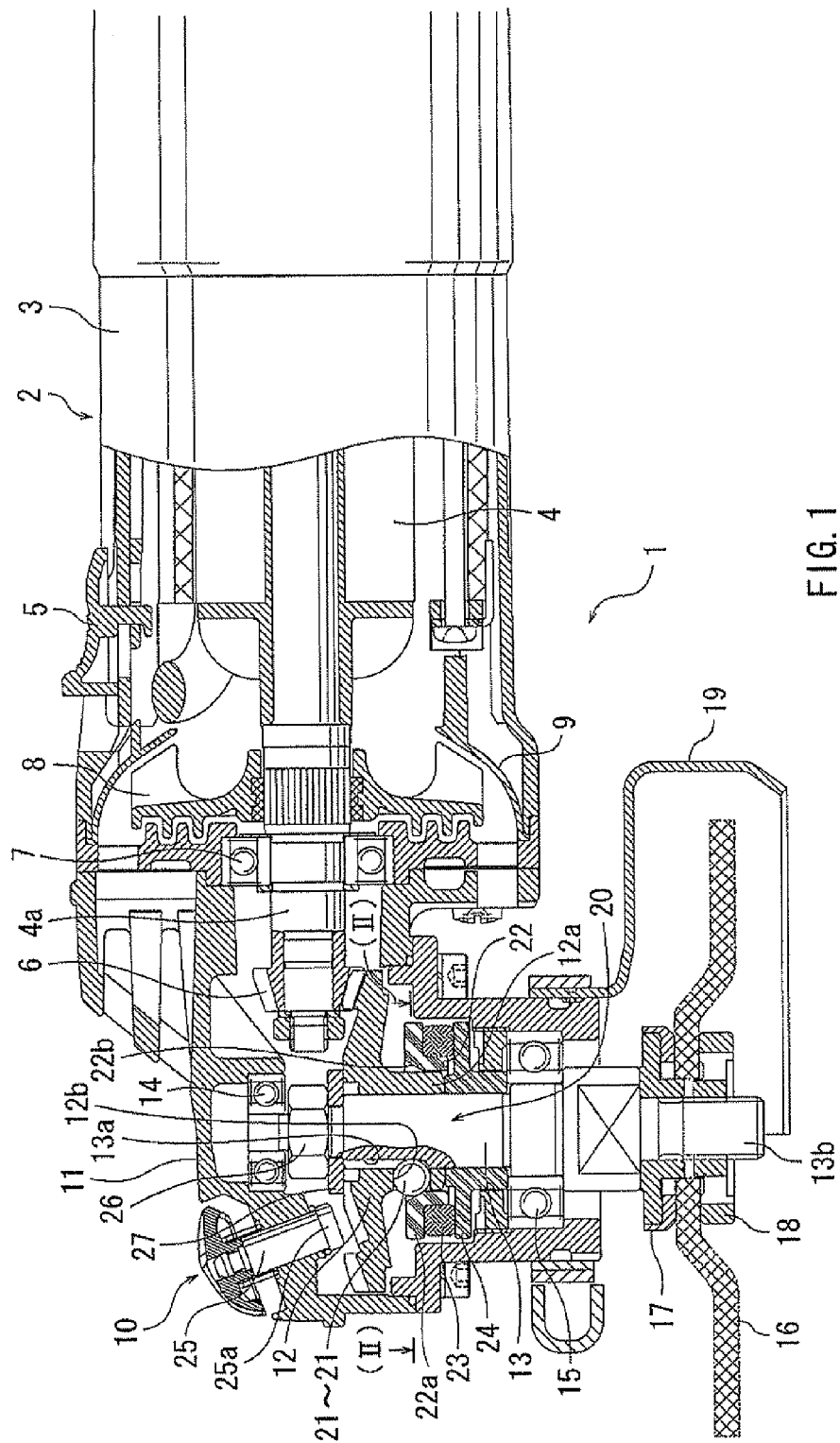
FIG. 1 is a side view of a disk grinder provided with an impact absorbing mechanism according to a first embodiment of the present invention. In this figure, a front portion of a tool body and a gear head portion having a gear train disposed therein are shown in a vertical sectional view. In addition, this figure shows a state where an electric motor is stopped.
Figure 2:
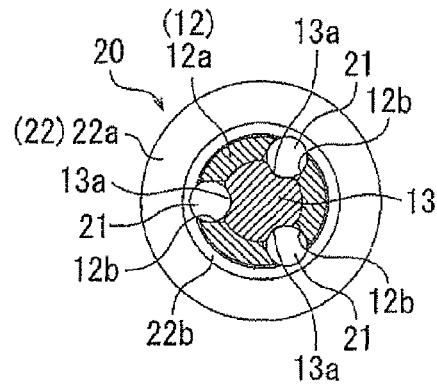
FIG. 2 is sectional view taken along line (II)-(II) in FIG. 1 and showing a horizontal sectional view of the gear train.
Figure 3:
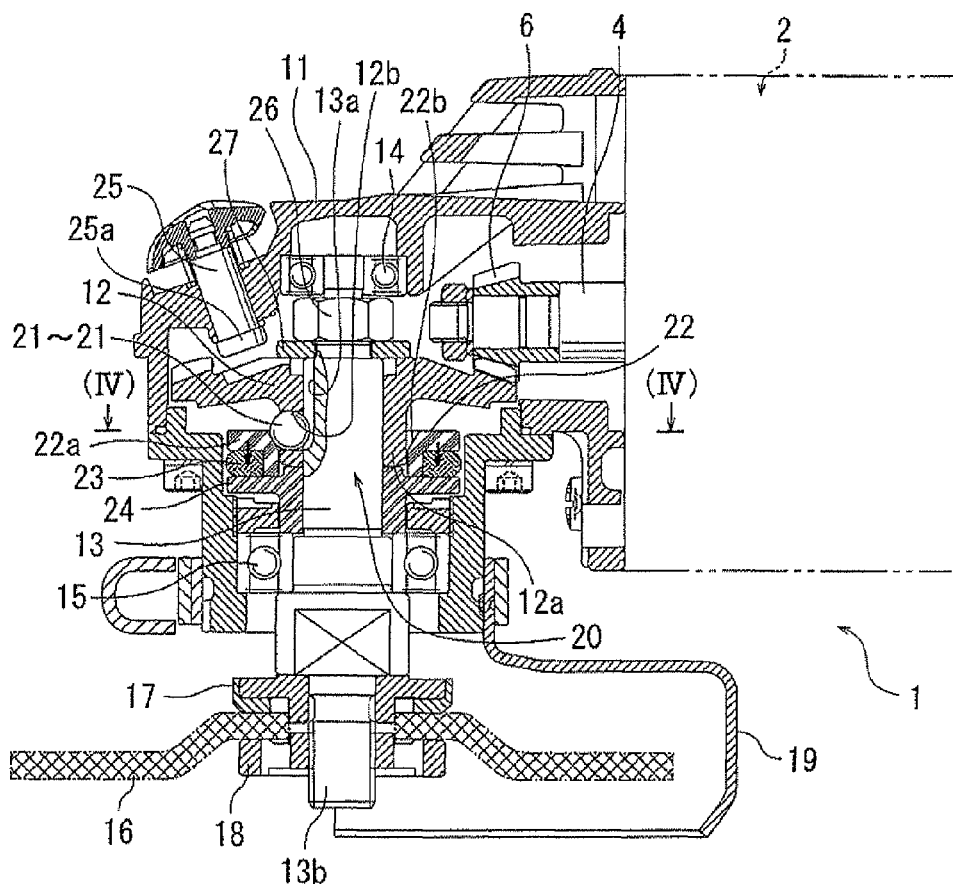
FIG. 3 is a vertical sectional view of the gear head portion with the impact absorbing mechanism of the first embodiment. This figure shows a state where the electric motor is started.

Next, embodiments of the present invention will be described by referring to FIGS. 1 to 18. FIG. 1 illustrates a disk grinder 1 with an impact absorbing mechanism according to a first embodiment. The disk grinder 1 includes a tool body portion 2 and a gear head portion 10. The tool body portion 2 has a configuration in which an electric motor 4 serves as a driving source and is disposed within a substantially cylindrical tubular body housing 3. The thickness of the body housing 3 may be set to be easily gripped by one hand of a user. A switch lever 5 which may be operated by a finger tip of a user is disposed on the upper portion of the body housing. When the switch lever 5 is slid to the front side (the left side in the drawing), the electric motor 4 can be started. When the switch lever 5 is slid to the rear side (the right side in the drawing), the electric motor 4 may be stopped.

A front portion of an output shaft 4a of the electric motor 4 may be rotatably supported by a bearing 7 which may be mounted to the front end portion of the body housing 3. Further, a motor cooling fan 8 may be mounted to the output shaft 4a. External air may be introduced from the rear portion of the body housing 3 located by the cooling fan 8 and a baffle plate 9 located nearby. The introduced external air flows forward inside the body housing 3, thereby efficiently cooling the electric motor 4.

The gear head portion 10 may be coupled to the front portion of the tool body portion 2. The gear head portion 10 includes a gear housing 11. The gear housing 11 may be coupled to the front portion of the body housing 3 of the tool body portion 2. The output shaft 4a of the electric motor 4 may protrude into the gear housing 11. A drive gear 6 may be mounted to the output shaft 4a of the electric motor 4. A bevel gear (a bevel gear wheel) may be used for the drive gear 6.

The drive gear 6 can mesh with a driven gear 12. A bevel gear (a bevel gear wheel) may also used as the driven gear 12. The drive gear 6 and the driven gear 12 constitute the term gear train used in the claims.

The driven gear 12 may be supported by a driven shaft 13. The upper portion of the driven shaft 13 may be rotatably supported by a bearing 14, and the lower portion thereof may be rotatably supported by a bearing 15. The driven shaft 13 may be supported in such a direction that its axis may be substantially perpendicular to the axis of the output shaft 4a of the electric motor 4.

The lower portion of the driven shaft 13 protrudes downward from the lower portion of the gear housing 11. A circular whetstone 16 may be attached to the protruding portion. A threaded shaft portion 13b may be formed on the lower end portion of the driven shaft 13. The whetstone 16 may be fixed to the driven shaft 13 by firmly tightening a fixing nut 18 against the threaded shaft portion 13b with the whetstone 16 interposed between the fixing nut and a fixed flange 17.

A whetstone cover 19 may be attached to the lower portion of the gear housing 11. The whetstone cover 19 may cover the rear half circumference range of the whetstone 16, thereby preventing ground powder from scattering backwards (toward the user).

The driven gear 12 may be supported so as to be relatively rotatable about the axis. However, the driven gear 12 may be supported by a thrust washer 27, which may be fixed onto the driven shaft 13 by a nut 26, so as not to be movable in the axial direction. An impact absorbing mechanism 20 may be interposed on a rotational power transmission path between the driven gear 12 and the driven shaft 13. The impact absorbing mechanism 20 of the first embodiment may preferably includes three steel balls 21 that are held by the driven gear 12, an axial displacement member 22 displaceable in the axial direction (in the vertical direction in FIG. 1) of the driven shaft 13, and an axial elastic member 23.

A boss portion 12a may be integrally formed with the lower surface of the driven gear 12. A driven shaft 13 may be inserted into the inner periphery of the boss portion 12a so as to be relatively rotatable. Holding holes 12b may be provided at tri-sectional positions around the boss portion 12a so as to penetrate in the radial direction. One steel ball 21 may be held inside each holding hole 12b so as to be displaceable in the radial direction. The thickness of the boss portion 12a may be appropriately set, so that the steel balls 21 protrude from both open end portions of the respective holding holes 12b.

Figure 4:
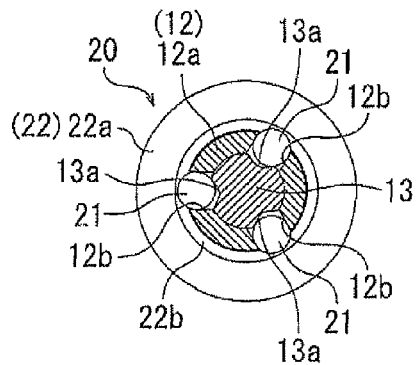
FIG. 4 is a sectional view taken along line (IV)-(IV) in FIG. 3 and showing a horizontal sectional view of the gear train.

In the driven shaft 13, three groove portions 13a having a V-shaped cross-section and elongated in the axial direction can be formed at the tri-sectional positions about the axis. One steel ball 21 protruding from the inner periphery of the boss portion 12a may be fitted into each groove portion 13a. For this reason, as shown in FIG. 4, when the driven gear 12 rotates relative to the driven shaft 13, each steel ball 21 may be displaced in the diameter expanding direction upward on the inclined surface of the groove portion 13a. Accordingly, each steel ball 21 corresponds to an example of a diameter-expanding-direction displacement member defined in the claims, and the inclined surface of each groove portion 13a corresponds to a first inclined surface.

The axial displacement member 22 may be disposed on the outer peripheral side of the boss portion 12a of the driven gear 12. The axial displacement member 22 may be formed in a cylindrical tubular shape having a flange portion 22a at its upper portion, and the boss portion 12a of the driven gear 12 may be inserted into its inner periphery so as to be relatively rotatable about the axis and to be relatively displaceable in the axial direction. A tapered surface 22b may be formed at the upper open end portion on the inner peripheral side of the axial displacement member 22. Three steel balls 21 protruding toward the outer peripheral side of the boss portion 12a are preferably in contact with the tapered surface 22b. The tapered surface 22b corresponds to a second inclined surface defined in the claims.

The axial elastic member 23 is preferably disposed on the lower surface side of the flange portion 22a on the outer peripheral side of the axial displacement member 22. The axial elastic member 23 preferably has an annular shape having a rectangular cross-section as shown in the drawings. An elastic with an appropriate elasticity in the axial direction can be used. A receiving flange 24 may be disposed on the lower side of the axial displacement member 22. The receiving flange 24 may be supported by the driven shaft 13 such that it is interposed between the boss portion 12a of the driven gear 12 and the inner race of the bearing 15 so as not to be displaced in the axial direction. The axial elastic member 23 may be interposed between the receiving flange 24 and the flange portion 22a of the axial displacement member 22. The axial displacement member 22 may be displaceable downward in the axial direction while the axial displacement member 23 may be compressed downward (against its elastic force) when pressed upon.

A lock button 25 for locking the idle rotation of the driven gear 12 may be disposed in the front portion on the upper surface side of the gear head portion 10. When the lock button 25 is pressed by a finger tip, a front end portion 25a protruding into the gear housing 11 may be fitted into any one of three stopper holes 12d provided in the upper surface of the driven gear 12, thereby locking the idle rotation of the driven gear 12. For this reason, when the lock button 25 is pushed at the time of removing or mounting the whetstone 16 from or to the driven shaft 13, the idle rotation of not only the driven gear 12 but also the driven shaft 13 is locked, so that the fixing nut 18 can be easily loosened or tightened, leading to facilitate the replacement and the maintenance works of the whetstone 16.

Impact generated due to meshing between the drive gear 6 and the driven gear 12 as the electric motor 4 is started or stopped may be absorbed by the displacement of the axial elastic member 23 in the axial direction. When the drive gear 6 meshes with the driven gear 12 to transmit rotational power thereto as the electric motor 4 is started, the driven gear 12 rotates slightly relative to the driven shaft 13. As the driven gear 12 rotates relative to the driven shaft 13, each steel ball 21 is preferably displaced within the groove portion 13a in the width direction relative thereto. Accordingly, each steel ball 21 is displaced in such a direction that the amount protruding toward the outer peripheral side of the boss portion 12a increases such that the steel ball 21 is preferably removed from the inside of the groove portion 13a (the diameter expanding direction).

As the protruding amount of each steel ball 21 toward the outer peripheral side of the boss portion 12a increases, the axial displacement member 22 is displaced downward by the interaction between each steel ball 21 and the tapered surface 22b of the axial displacement member 22. As described previously, the axial displacement member 22 is displaced downward against the elastic force of the axial elastic member 23. Thus, the driven gear 12 rotates relative to the driven shaft 13 while the axial displacement member 22 is displaced in the axial direction against the elastic force of the axial elastic member 23, whereby impact generated when the drive gear 6 and the driven gear 12 mesh with each other is absorbed.

In this way, the impact absorbing mechanism 20 of the first embodiment is configured to absorb impact by converting the rotation of the driven gear 12 relative to the driven shaft 13 into the displacement of the axial displacement member 22 in the axial direction, and therefore, there is no need to interpose a small elastic component between the driven gear and the driven shaft in order to apply an elastic force in the relative rotation direction as in the related art. Accordingly, it is possible to improve the ease of manufacture and the durability of the impact absorbing mechanism 20 and of the disk grinder 1 overall.

Further, with the impact absorbing mechanism 20 of the first embodiment, the displacement amount of the steel balls 21 and the displacement amount of the axial displacement member 22 may be appropriately set by arbitrarily setting the inclination angle of the groove portion 13a as the first inclined surface or the inclination angle of the tapered surface 22b (the first inclined surface) as the second inclined surface, whereby it is possible to appropriately set the displacement amount of the axial elastic member 23. For this reason, it is possible to easily obtain a sufficient cushion function by appropriately setting the displacement amount of the axial elastic member 23 without increasing the diameter of the driven gear as in the related art.

Furthermore, since the biasing force of the axial elastic member 23 is applied in a direction in which the upper driven gear 12 deeply meshes with the drive gear 6 through the second inclined surface 22b and the steel balls 21, the meshing sate of the drive gear 6 with the driven gear 12 can be properly maintained. The impact generated at the time of starting the electric motor 4 may be reduced also in this respect.

The first embodiment may be modified in various forms. For example, although the groove portions 13a having a V-shaped cross-section are exemplified as the first inclined surface, this may be replaced with a construction to provide groove portions having a semi-circular cross-section.

FIGS. 5 to 8 illustrate an impact absorbing mechanism 30 according to a second embodiment. Members similar to those of the first embodiment will be given the same reference numerals as those of the first embodiment, and the description thereof will be omitted. In the impact absorbing mechanism 20 of the first embodiment, the impact is absorbed due to displacement of the axial displacement member 22 in the axial direction as each steel ball 21 serving as the diameter-expanding-direction displacement member is displaced in the diameter expanding direction. However, in a second embodiment to be described later, it is configured such that impact is directly absorbed with respect to movement in each direction of each roller 31 serving as a diameter-expanding-direction displacement member.

Similar to the first embodiment, at the tri-sectional positions on the axis, the driven shaft 13 is preferably provided with the groove portions 13a elongated in the axial direction and having a V-shaped cross-section. The roller 31 is fitted into each groove portion 13a. Each roller 31 is preferably held by the holding hole 12b provided in the boss portion 12a of the driven gear 12 so as to be displaceable in the diameter expanding direction. Each roller 31 is pressed against the diameter-expanding-direction elastic member 32 as it is displaced in the diameter expanding direction. As shown in FIG.

6, the diameter-expanding-direction elastic member 32 is preferably a C-shaped metal spring and has a biasing force for displacing each roller 31 in a diameter contracting direction (a direction pressing into the groove portion 13a).

An engagement convex portion 12c protruding towards the outer peripheral side of the boss portion 12a of the driven gear 12 enters between opposite end portions of the diameter-expanding-direction elastic member 32. Accordingly, the rotation of the diameter-expanding-direction elastic member 32 can be prevented, so that a gap between opposite end portions of the diameter-expanding-direction elastic member 32 does not open up at the outer peripheral side of each roller 31. For this reason, all of the rollers 31 are normally pressed against the inner peripheral surface of the diameter-expanding-direction elastic member 32.

A holding sleeve 33 may be supported on the driven shaft 13 on the lower side of the driven gear 12 so as to be coaxial with the driven gear 12. The holding sleeve 33 may be supported by the driven shaft 13 while the displacement in the axial direction may be restricted. A holding cylindrical tubular portion 33a which may protrude with an L-shaped cross-section may be integrally formed with the outer periphery of the holding sleeve 33. The diameter-expanding-direction elastic member 32 may be accommodated in a cylindrical tubular space between the holding cylindrical tubular portion 33a and the boss portion 12a of the driven gear 12.

Figure 5:
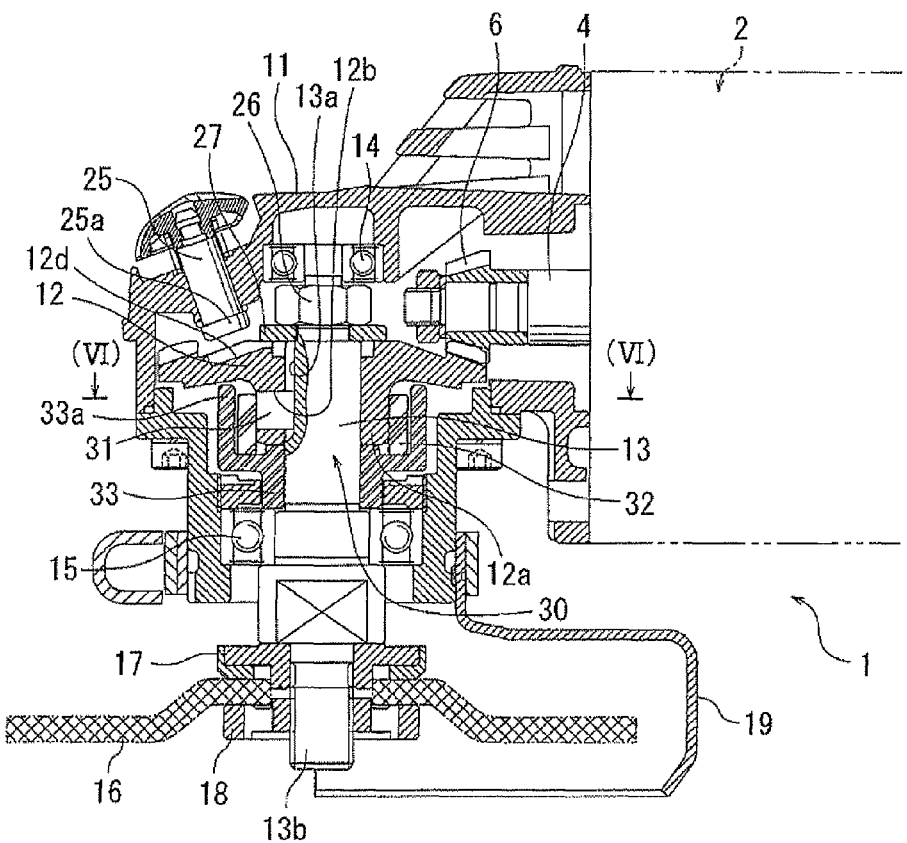
FIG. 5 is a vertical sectional view of a gear head portion with an impact absorbing mechanism according to a second embodiment of the present invention. This figure shows a state where the electric motor is stopped.
Figure 6:
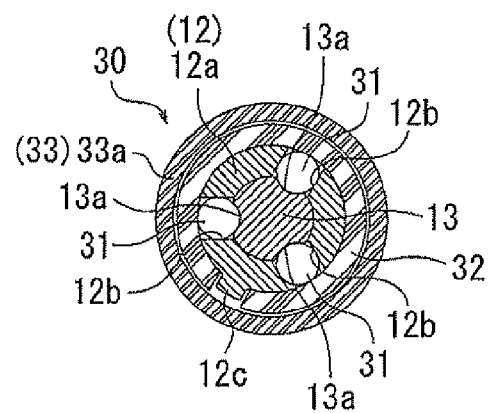
FIG. 6 is a sectional view taken along line (VI)-(VI) in FIG. 5 and showing a horizontal sectional view of a gear train.

As shown in FIGS. 5 and 6, while the electric motor 4 is inactive and rotational power is not generated, each roller 31 may be pressed into the deepest position inside the groove portion 13a by the biasing force of the diameter-expanding-direction elastic member 32. As a result, the diameter-expanding-direction elastic member 32 may be displaced in the diameter contracting direction so as to substantially closely contact the boss portion 12a of the driven gear 12, so that a gap is formed between the diameter-expanding-direction elastic member and the holding cylindrical tubular portion 33a.

According to the impact absorbing mechanism 30 of the second embodiment with the above-described configuration, impact generated by meshing between the drive gear 6 and the driven gear 12 when starting and stopping the electric motor 4 is absorbed by the diameter-expanding-direction elastic member 32. When the drive gear 6 meshes with the driven gear 12 to transmit rotational power thereto due to the starting of the electric motor 4, the driven gear 12 slightly rotates relative to the driven shaft 13. As the driven gear 12 rotates relative to the driven shaft 13, each roller 31 is relatively displaced inside the groove portion 13a in the width direction to ascend along the first inclined surface toward the shallower position as shown in FIGS. 7 and 8, and therefore, each roller 31 is displaced in a direction of increasing the protruding amount toward the outer peripheral side of the boss portion 12a in a direction away from the inside of the groove portion 13a (the diameter expanding direction).

As the amount of each roller 31 protruding towards the outer peripheral side of the boss portion 12a increases, each roller 31 is pressed against the inner peripheral surface of the diameter-expanding-direction elastic member 32. As a result, the diameter-expanding-direction elastic member 32 becomes elastically deformed in the diameter expanding direction against the biasing force, so that the impact generated upon meshing between the drive gear 6 and the driven gear 12 is absorbed. For this reason, the displacement of each roller 31 in the diameter expanding direction acts against the biasing force of the diameter-expanding-direction elastic member 32, so that the rotation of the driven gear 12 relative to the driven shaft 13 acts against the biasing force of the diameter-expanding-direction elastic member 32.

Figure 7:
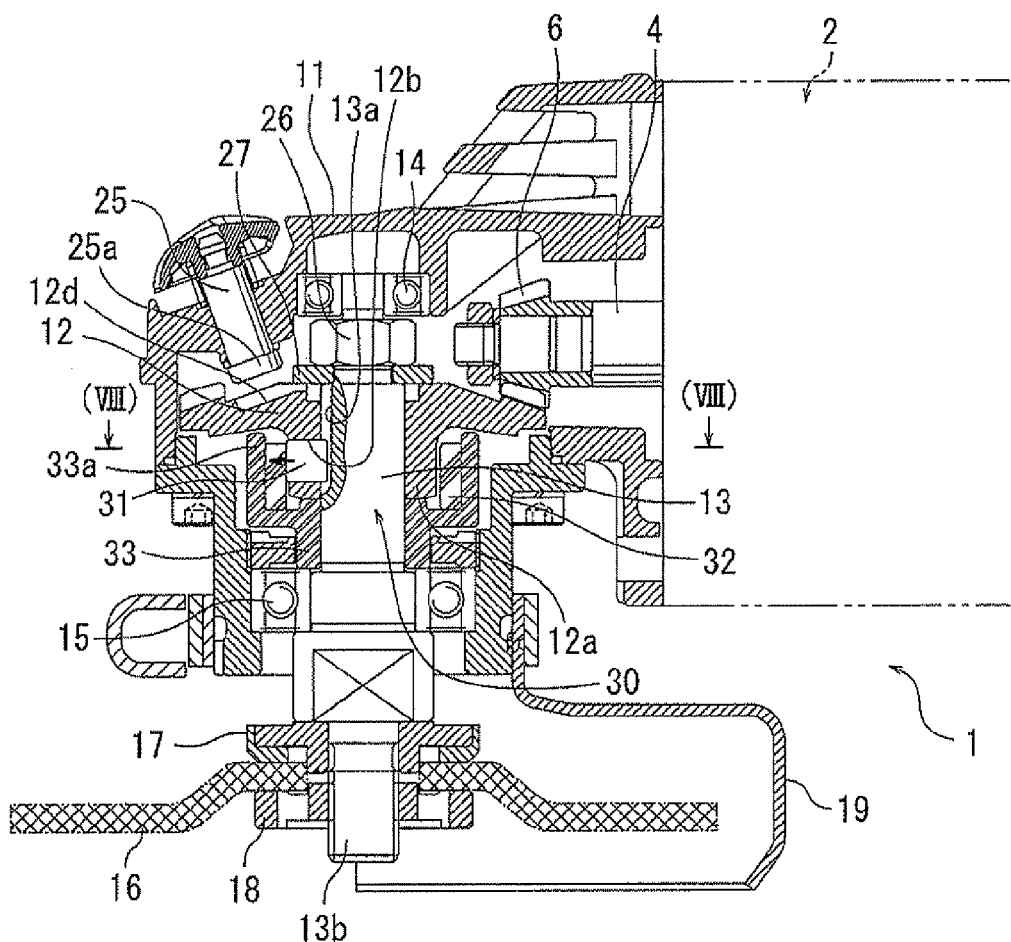
FIG. 7 is a vertical sectional view of the gear head portion with the impact absorbing mechanism according to the second embodiment. This figure shows a state where the electric motor is started.
Figure 8:
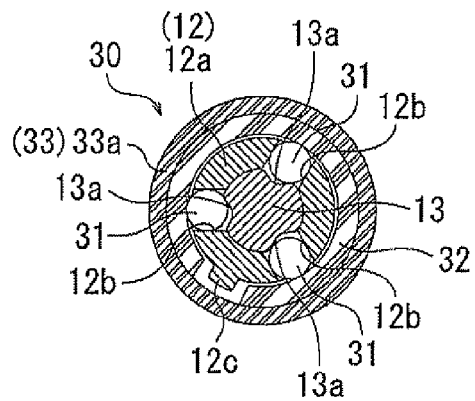
FIG. 8 is a sectional view taken along line (VIII)-(VIII) in FIG. 7 and showing a horizontal sectional view of the gear train.

FIGS. 7 and 8 illustrate the state where the driven gear 12 has been rotated relative to the driven shaft 13, so that each roller 31 has been displaced to the shallower position of the groove portion 13a (in the diameter expanding direction) and the diameter-expanding-direction elastic member 32 has been pressed and widened in the diameter expanding direction; and as a result, the diameter-expanding-direction elastic member 32 has been pressed and widened to a position where the diameter-expanding-direction elastic member 32 substantially closely contacts the inner peripheral surface of the holding sleeve 33a, so that a gap is formed between the diameter-expanding-direction elastic member and the boss portion 12a.

Furthermore, in the second embodiment, a member corresponding to the axial displacement member 22 of the first embodiment is omitted. Accordingly, an inclined surface corresponding to the second inclined surface (the tapered surface 22b) of the first embodiment is omitted.

In this way, in the impact absorbing mechanism 30 of the second embodiment, impact is absorbed by converting the rotation of the driven gear 12 relative to the driven shaft 13 into the elastic deformation of the diameter-expanding-direction elastic member 32 in the diameter expanding direction.

The second embodiment also may be modified into various forms. For example, groove portions having a semi-circular cross-section may be used instead of the groove portions 13a having a V-shaped cross-section and serving as the first inclined surface.

Figure 9:
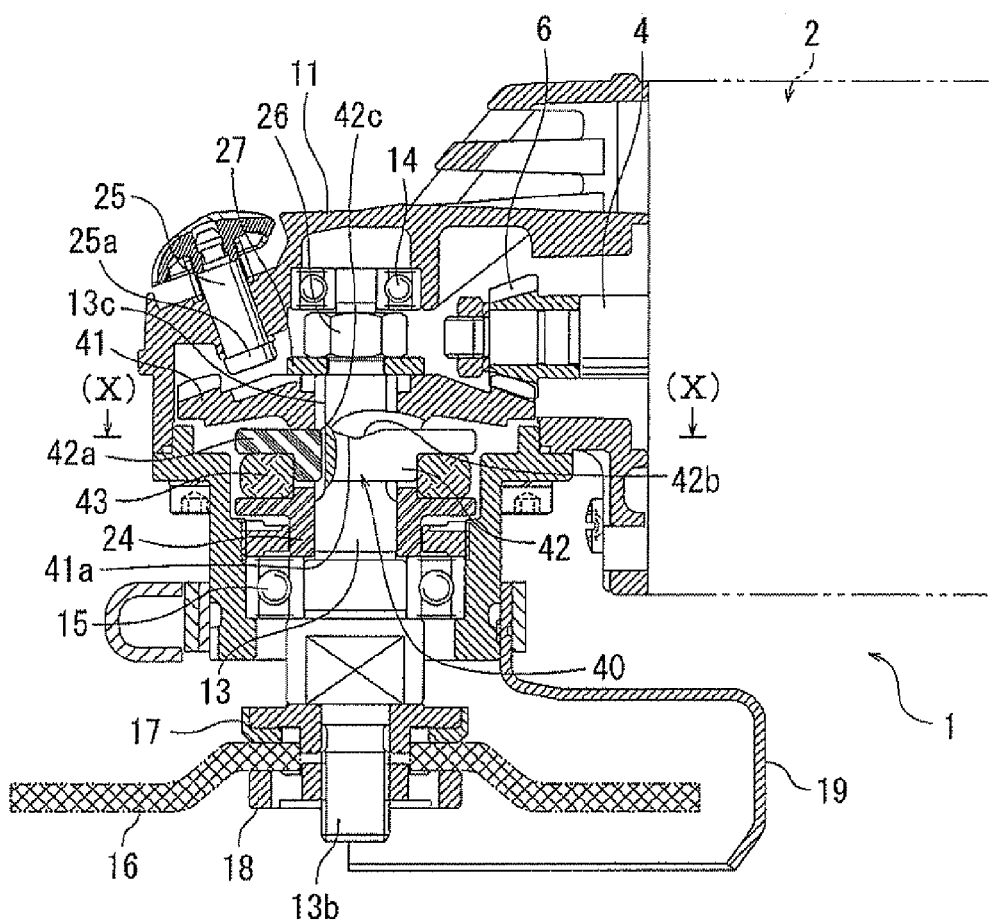
FIG. 9 is a vertical sectional view of a gear head portion with an impact absorbing mechanism according to a third embodiment of the present invention. This figure shows a state where an electric motor is stopped.
Figure 10:
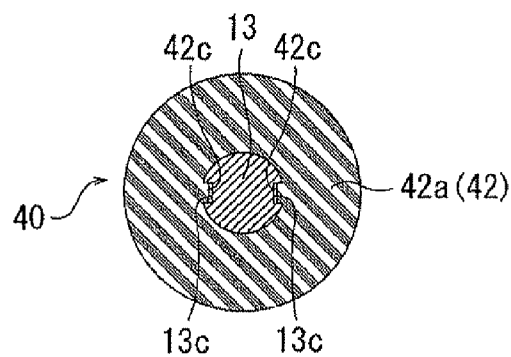
FIG. 10 is a sectional view taken along line (X)-(X) in FIG. 9 showing a horizontal sectional view of a gear train.
Figure 11:
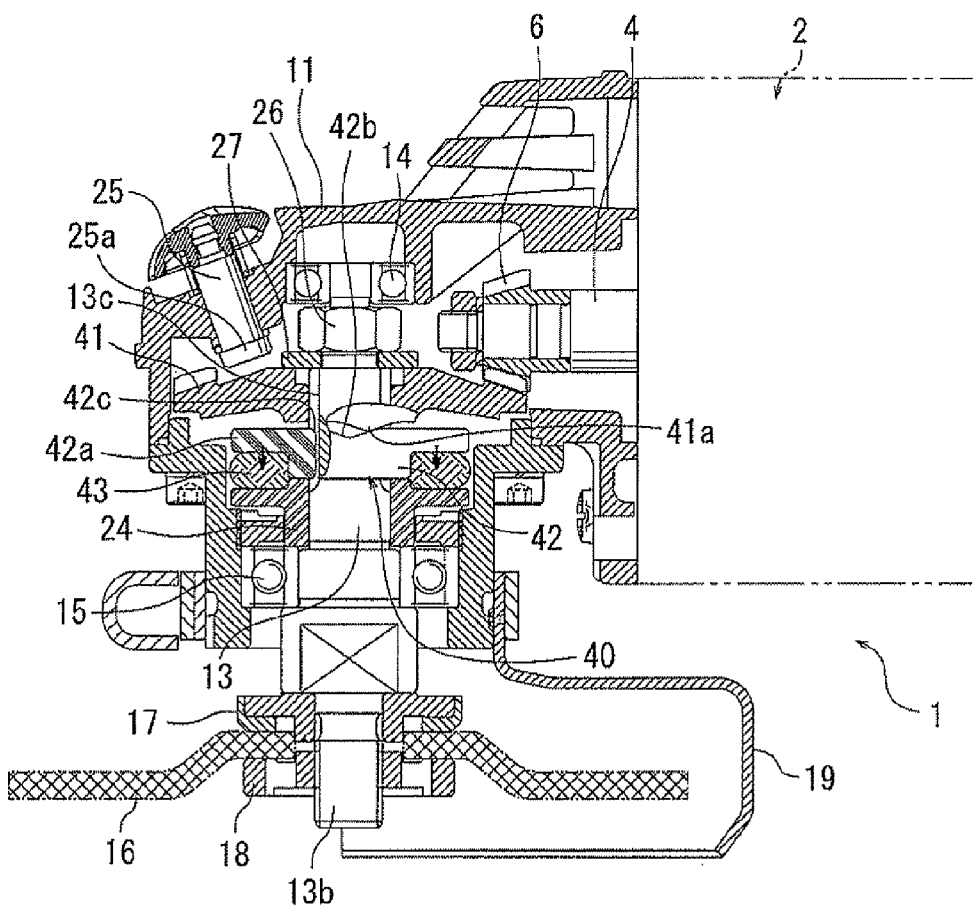
FIG. 11 is a vertical sectional view of the gear head portion with the impact absorbing mechanism according to the third embodiment. This figure shows the state where the electric motor is started.

Next, FIGS. 9 to 11 illustrate an impact absorbing mechanism 40 according to a third embodiment. In the third embodiment, the steel balls 21 serving as the diameter-expanding-direction displacement member of the first embodiment are omitted and are replaced with a cam portion provided between a driven gear 41 and an axial displacement member 42, so that, as the driven gear 41 rotates relative to the driven shaft 13, impact is absorbed by displacing the axial displacement member 42 in the axial direction by the action of the cam portion. Members and constructions similar to those of the first embodiment will be given the same reference numerals and the description will be omitted.

The driven gear 41 meshing with the drive gear 6 may be relatively rotatably supported on the driven shaft 13. The lower end portion of a boss portion of the driven gear 41 may be provided with cam convex portions 41a protruding downward in a V-shape. Both cam convex portions 41a are disposed at the bisection positions about the axis.

The axial displacement member 42 may be disposed on the lower side of the driven gear 41. The axial displacement member 42 may be axially displaceably supported by the driven shaft 13. The upper open end portion of the inner peripheral hole of the axial displacement member 42 may be provided with V-shaped cam concave portions 42b which correspond to the cam convex portions 41a. Further, in the inner peripheral hole of the axial displacement member 42, engagement convex portions 42c having a rectangular cross-section are provided at the bisectional positions in the circumferential direction, which are opposed to each other. Both engagement convex portions 42c and 42c are inserted into engagement groove portions 13c which are respectively provided in the driven shaft 13, also have a rectangular cross-section and are elongated in the axial direction. For this reason, the axial displacement member 42 is supported so as to be displaceable in the axial direction relative to the driven shaft 13 while being non-rotatable about the axis.

Similar to the first embodiment, the axial displacement member 42 is provided with a flange portion 42a. An axial elastic member 43 is interposed on the lower surface side of the flange portion 42a. On the lower side of the axial displacement member 42, the receiving flange 24 is supported by the driven shaft 13 as in the first embodiment. Similar to the first embodiment, the receiving flange 24 is supported by the driven shaft 13 in the state that its displacement in the axial direction is restricted. The axial displacement member 42 is displaceable in the axial direction between the receiving flange 24 and the driven gear 41.

The axial elastic member 43 is preferably interposed between the receiving flange 24 and the flange portion 42a of the axial displacement member 42. As in the first embodiment, an annular elastic may be used for the axial elastic member.

In the impact absorbing mechanism 40 of the third embodiment with the above-described configuration, impact generated by meshing between the driven gear 6 and the driven gear 41 when starting or stopping the electric motor 4 is preferably absorbed by the displacement of the axial displacement member 42 in the axial direction. When the drive gear 6 meshes with the driven gear 41 to transmit rotational power due to the starting of the electric motor 4, the driven gear 41 slightly rotates relative to the driven shaft 13. As the driven gear 41 rotates relative to the driven shaft 13, the cam convex portions 41a on the side of the driven gear 41 are preferably displaced about the axis relative to the cam concave portions 42b on the side of the axial displacement member 42 that does not rotate relative to the driven shaft 13. As a result, the cam convex portion 41a is preferably displaced to a shallower position of the cam concave portion 42b, so that the axial displacement member 42 is displaced downward in the axial direction. Since the axial elastic member 43 is preferably interposed between the flange portion 42a of the axial displacement member 42 and the receiving flange 24, the axial displacement member 42 is preferably displaced downward while pressing and compressing the axial elastic member 43 (against the elastic force), whereby impact generated by meshing between the drive gear 6 and the driven gear 12 may be absorbed. In this way, as also occurs with the construction of the impact absorbing mechanism 40 of the third embodiment, impact is absorbed by converting the rotation of the driven gear 41 relative to the driven shaft 13 into the displacement of the axial displacement member 42 in the axial direction.

Further, since the biasing force of the axial elastic member 43 is applied through the axial displacement member 42 in an upward direction in which the driven gear 41 deeply meshes with the drive gear 6, the meshing state of the drive gear 6 with the driven gear 41 can be properly maintained. Impact generated when starting the electric motor 4 may be reduced also in this respect.

FIGS. 12 to 17 illustrate an impact absorbing mechanism 50 according to a fourth embodiment. The impact absorbing mechanism 50 according to the fourth embodiment is configured to further improve durability of the impact absorbing mechanism 20 of the first embodiment. Members similar to those of the first embodiment will be given the same reference numerals and the description thereof will be omitted. In the impact absorbing mechanism 50 of the fourth embodiment, steel balls 53 serving as a diameter-expanding-direction displacement member indirectly engage with the first inclined surface 13d of the driven shaft 13 via intermediate rollers 52.

Similar to the first embodiment, the driven gear 51 meshing with the drive gear 6 is relatively rotatably supported on the driven shaft 13. However, the movement of the driven gear 51 in the axial direction is generally restricted as it is held between the thrust washer 27, which is fixed onto the driven shaft 13 by the nut 26, and the receiving flange 56 that is restricted in its movement in the axial direction by the bearing 15.

Figure 13:
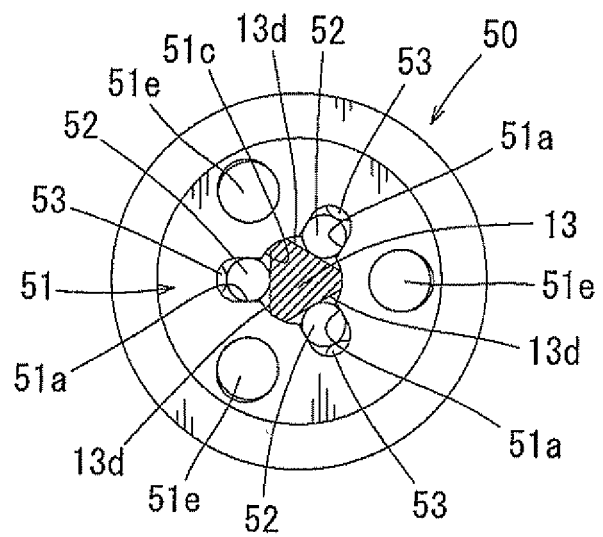
FIG. 13 is a view taken along line (XIII)-(XIII) in FIG. 12 showing a plan view of a driven gear.

On the upper portion of the driven shaft 13, three first inclined surfaces 13d are provided and are different from the groove portions 13a of the first embodiment in that they are formed by being flatly chamfered at tri-sectional positions about the axis. The upper portion of the driven shaft 13 provided with the first inclined surfaces 13d is inserted into a support hole 51c of a driven gear 51. As shown in FIG. 13, on the upper surface side of the driven gear 51, roller holding grooves 51a are provided along the radiating direction at the tri-sectional positions of the support hole 51c in the circumferential direction. One intermediate roller 52 is held inside each roller holding groove 51a. Each intermediate roller 52 is maintained in a posture in which its axis is positioned so as to be parallel to the axis of the driven shaft 13. Further, each intermediate roller 52 is positioned between the thrust washer 27 and an upper surface of a cylindrical shaft portion 56a of the receiving flange portion 56, so that the displacement in the axial direction is restricted.

The intermediate rollers 52 respectively slidably contact with the respective first inclined surface 13d of the driven shaft 13 in a line-contact relationship. When the relative rotation between the driven gear 51 and the driven shaft 13 occurs, each intermediate roller 52 is pressed against the first inclined surface 13d and moves in parallel in a direction outward with respect to the radial direction of the spindle (the radiating direction). Each intermediate roller 52 moves in parallel in the radial direction within a movable range inside the roller holding groove 51a.

Figure 14:
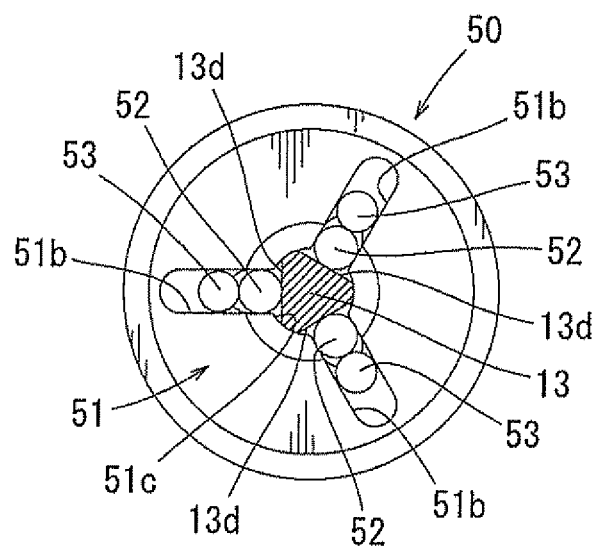
FIG. 14 is a view taken along line (XIV)-(XIV) in FIG. 12 showing a bottom view of the driven gear.
Figure 15:
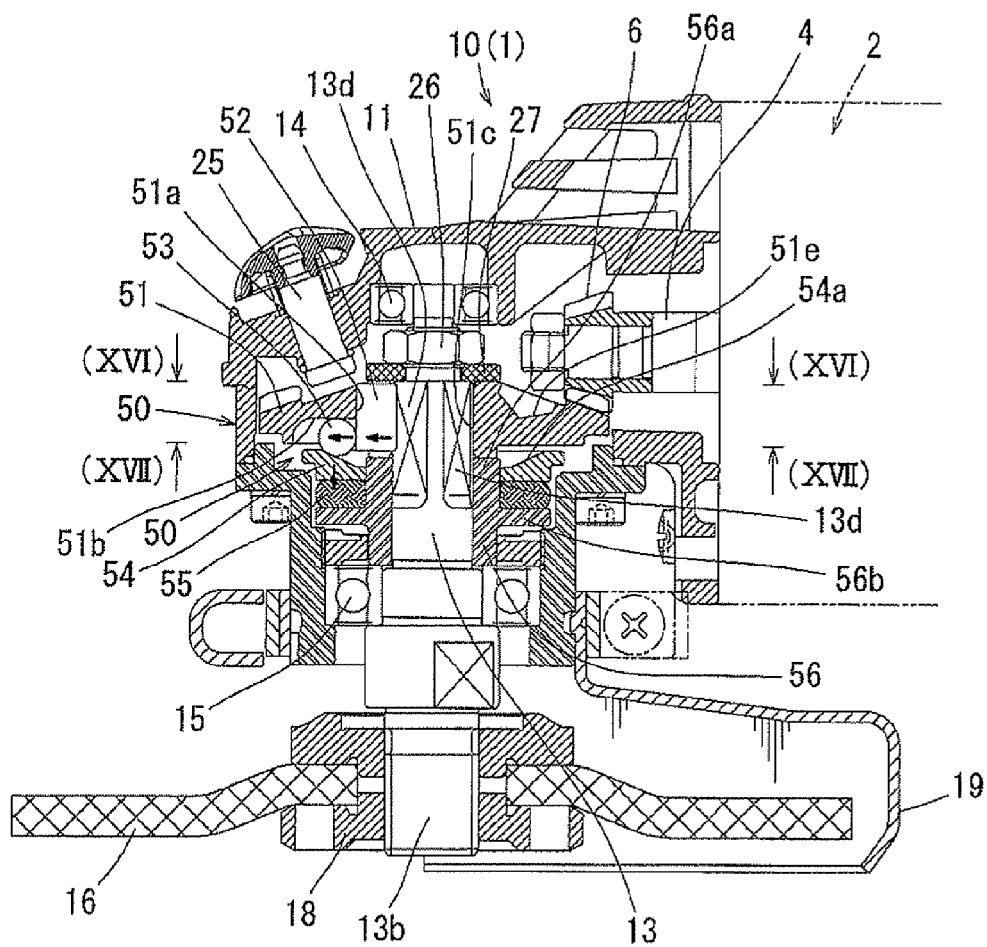
FIG. 15 is a vertical sectional view of the gear head portion with the impact absorbing mechanism according to the fourth embodiment. This figure shows a state where the electric motor is started.
Figure 16:
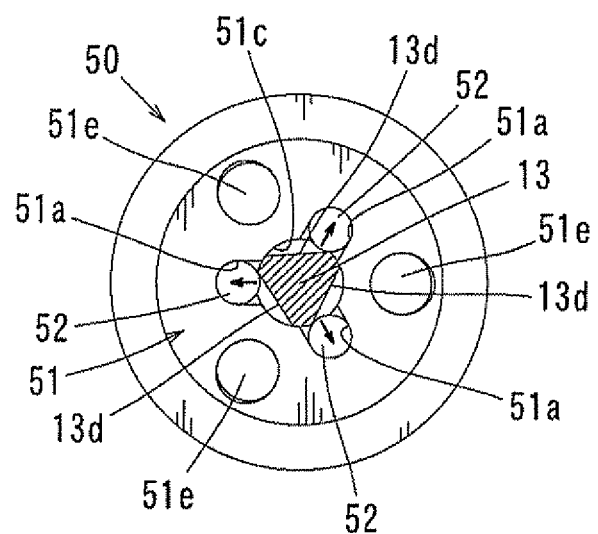
FIG. 16 is a sectional view taken along line (XVI)-(XVI) in FIG. 15 showing a plan view of the driven gear.
Figure 17:
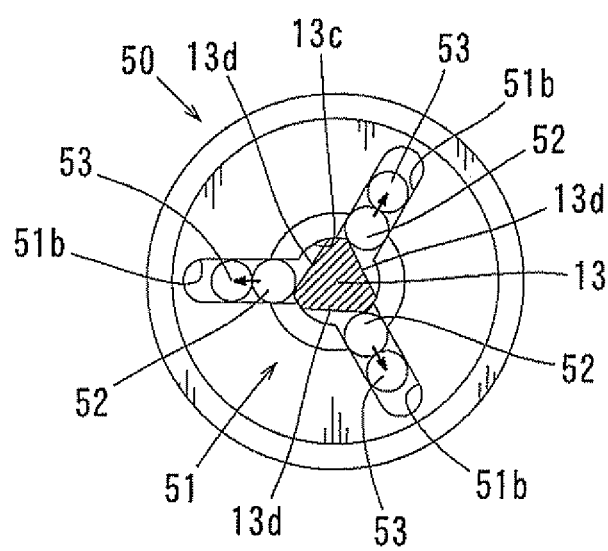
FIG. 17 is a view taken along line (XVII)-(XVII) in FIG. 15 showing a bottom view of the driven gear.

As shown in FIG. 14, on the lower surface side of the driven gear 51, steel ball holding grooves 51b are provided along the radiating direction at the tri-sectional positions of the support hole 51c in the circumferential direction. The positions of three steel ball holding grooves 51b in the circumferential direction correspond to the positions of the roller holding grooves 51a disposed on the upper surface side. For this reason, the upper portion of each intermediate roller 52 is positioned in the roller holding groove 51a, and the lower portion thereof is positioned inside the steel ball holding groove 51b.

One steel ball 53 is movably held inside each steel ball holding groove 51b. When relative rotation is caused between the driven gear 51 and the driven shaft 13, each intermediate roller 52 moves in parallel outward in the radiating direction while slidably contacting with the first inclined surface 13d, so that each steel ball 53 is pressed in the same direction by the intermediate roller 52.

Each steel ball 53 protrudes outward from the lower surface (the steel ball holding groove 51b) of the driven gear 51 and is in contact with a second inclined surface 54a of an axial displacement member 54. The axial displacement member 54 is supported so as to be displaceable in the axial direction via a cylindrical tubular shaft portion 56a of a receiving flange 56. On a lower surface side of the axial displacement member 54, an axial elastic member 55 is interposed around the cylindrical tubular shaft portion 56a of the receiving flange 56. The axial elastic member 55 is held between the axial displacement member 54 and the flange portion 56b of the receiving flange 56.

As relative rotation occurs between the driven gear 51 and the driven shaft 13 to press each steel ball 53 outward in the radiating direction by the intermediate roller 52, as described above, each steel ball 53 is relatively displaced in a direction of moving upward along the second inclined surface 54a of the axial displacement member 54, so that the axial displacement member 54 is displaced (downward) in a direction away from the lower surface of the driven gear 51 while pressing and compressing the axial elastic member 55 (against the elastic force). For this reason, the rotation of the driven gear 51 relative to the driven shaft 13 is performed against the elastic force of the axial elastic member 55 as in the first embodiment, so that impact generated upon transmitting a driving force between the driven gear 51 and the driven shaft 13 is absorbed.

Figure 12:
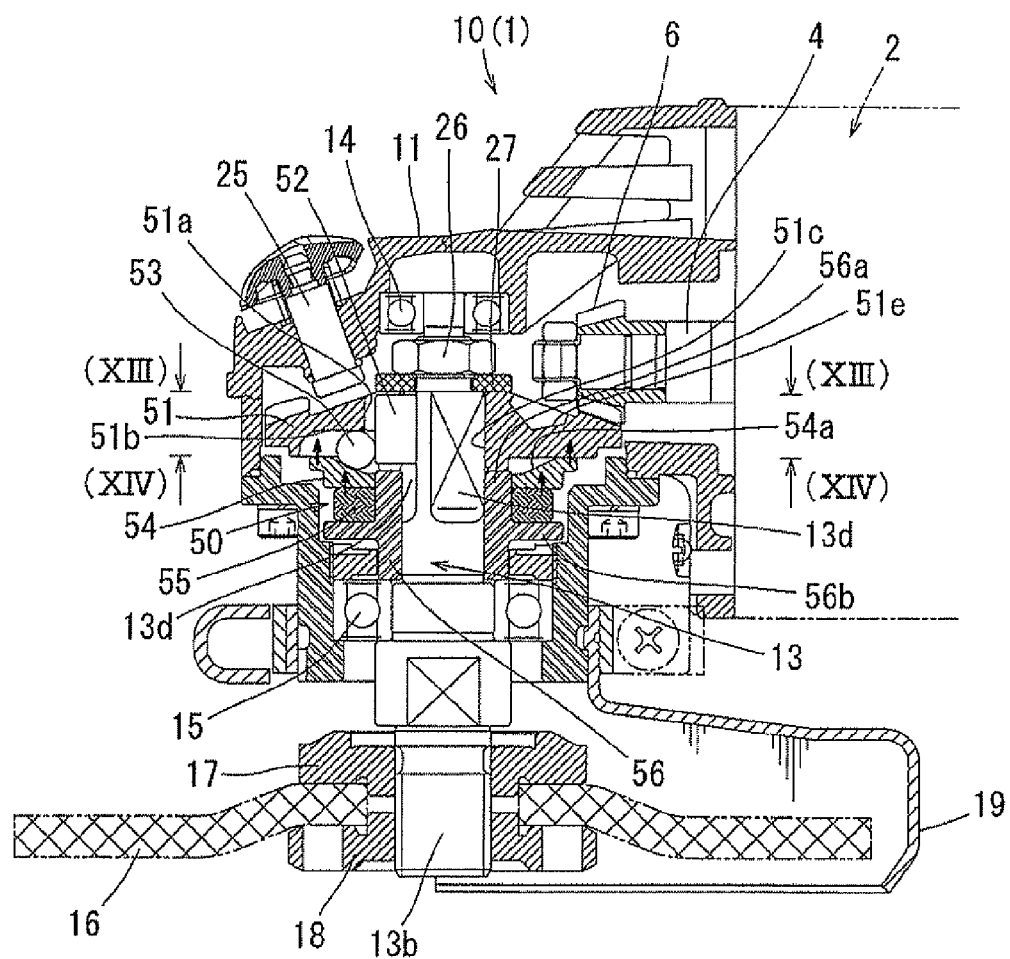
FIG. 12 is a vertical sectional view of a gear head portion with an impact absorbing mechanism according to a fourth embodiment. This figure shows a state where an electric motor is stopped.

Further, as shown in FIG. 12, in a state where a driving force is interrupted, each steel ball 53 is positioned at the lowest position of the second inclined surface 54a (inward in the radiating direction), and accordingly, the inclination angle of the second inclined surface 54a or the diameter of each steel ball 53, etc. is appropriately set so that the axial displacement member 54 is elastically pressed against the lower surface of the driven gear 51 by the biasing force of the axial elastic member 55.

On the upper surface of the driven gear 51, three stopper holes 51e to 51e are provided at the tri-sectional positions in the circumferential direction. Similar to the above embodiments, the lock button 25 is pressed so that its front end portion 25a is fitted into any one of three stopper holes 51e, and hence the driven gear 51 and the driven shaft 13 can be conveniently locked during replacement of the whetsone or the like.

As rotation occurs between the driven shaft 13 and the driven gear 51 when starting or stopping the electric motor 4 (when transmitting or interrupting the driving force), each intermediate roller 52 may be pressed outward in the radiating direction by the action of inclination of the first inclined surfaces 13d, so that each steel ball 53 may be displaced in the same direction inside the steel ball holding groove 51b. Since each steel ball 53 is pressed outward in the radiating direction inside the steel ball holding groove 51b, the axial elastic member 55 is deformed in a direction in which it is pressed and compressed, thereby absorbing impact generated when the power is transmitted or interrupted according to starting or stopping of the electric motor 4.

Further, since the intermediate rollers 52 may be pressed against the first inclined surface 13d of the driven shaft 13 in a line-contact relationship therewith, it is possible to reduce concentration of stress generated on the first inclined surfaces 13d. This may reduce its abrasion and eventually improve the durability of the impact absorbing mechanism 50.

Furthermore, the axial elastic member 55 performs various functions in addition to the impact absorbing function at the time of starting or stopping the electric motor. As shown in FIG. 12, in the power interrupted state, each steel ball 53 is preferably disposed at the lowest position of the second inclined surface 54a, and therefore, the axial displacement member 54 is elastically pressed against the lower surface of the driven gear 51 by the biasing force of the axial elastic member 55. It is thereby possible to prevent so-called lowering of the driven gear 51 (a phenomenon in which the upper surface moves away from the thrust washer 27 to cause shallow meshing of the drive gear 6), so that a secure meshing state of the drive gear 6 is maintained, and hence impact generated when starting the electric motor 4 is reduced.

Further, it is possible to change the displacement amount of the steel balls 533 and the displacement amount of the axial displacement member 54 by increasing the number of flat chamfered portions serving as the first inclined surface, changing the distance from the axis of the first inclined surface, or changing the inclination angle of the second inclined surface 54a of the axial displacement member 54. In this manner, it is possible to obtain a sufficient impact absorbing function.

The fourth embodiment also may be modified into various forms. Although a configuration is exemplified in which three first inclined surfaces 13d are provided at the peripheral surface of the driven shaft 13, four first inclined surfaces or six first inclined surfaces may be provided. Accordingly, the combination of one intermediate roller 52 and one steel ball 53 may be disposed at four positions or six portions other than the configuration in which the combination is disposed at three positions in the circumferential direction as exemplified.

Further, although a chamfered flat surface at the periphery of the driven shaft 13 has been exemplified as the first inclined surface 13d, the V-shaped groove portion may be formed as the first inclined surface as in the first embodiment. In this case, it may be possible to configure such that the intermediate roller slidably contacts the V-shaped groove portion as the first inclined surface in a line-contact relationship.

Figure 18:
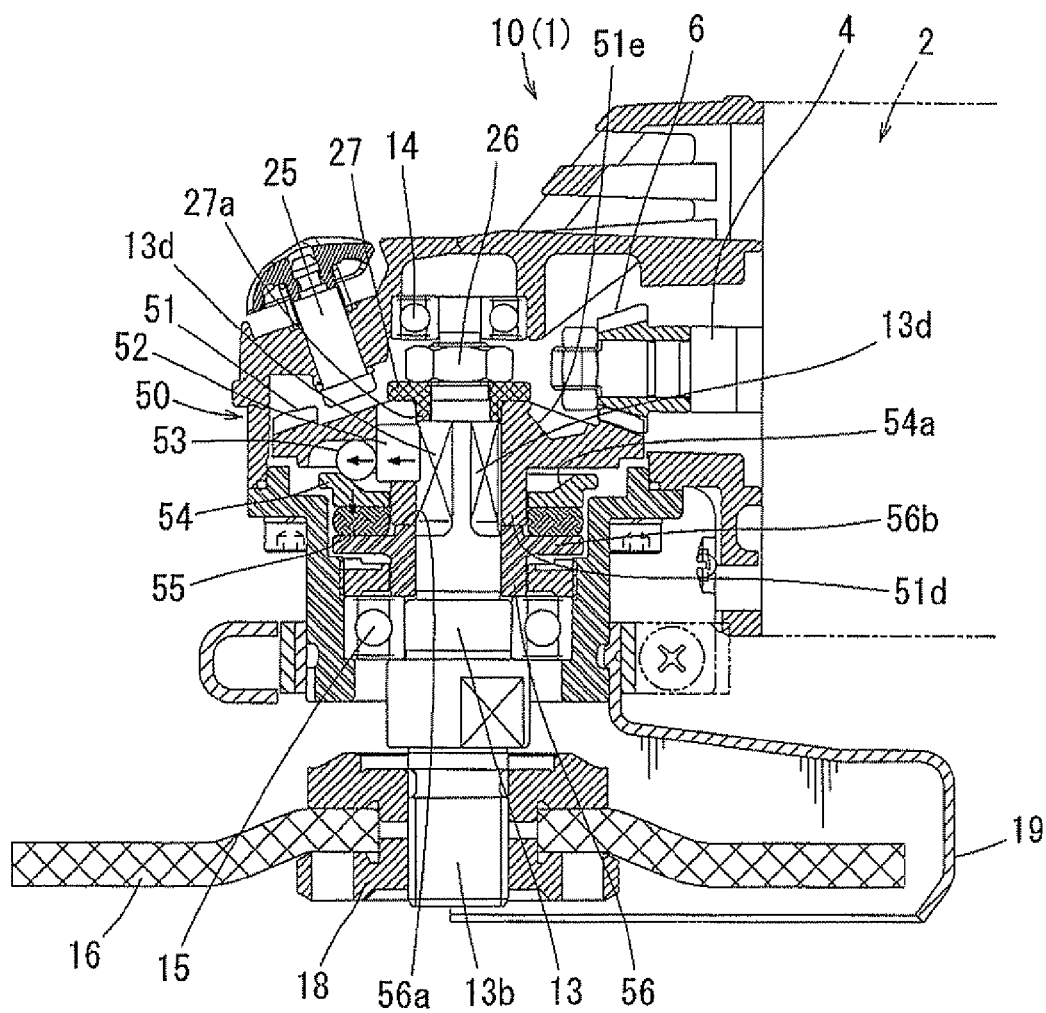
FIG. 18 is vertical sectional view of a gear head portion with modification to the impact absorbing mechanism of the fourth embodiment. This figure shows a state where the electric motor is started.

Furthermore, the displacement of each intermediate roller 52 in the axial direction (the vertical direction) may be restricted by the thrust washer 27 and the upper surface of the cylindrical tubular shaft portion 56a of the receiving flange 56. However, it may be possible to configure it such that the downward displacement is restricted by a boss portion 51d of the driven gear 51 extending downward for holding each intermediate roller 52 as shown in FIG. 18. In this case, it may be possible to configure it such that the axial displacement member 54 and the axial elastic member 55 are supported on the outer peripheral side of the boss portion 51d that extends downward. Accordingly, in this case, the upper portion of the cylindrical tubular shaft portion 56a of the receiving flange 56 may have a shape cut to be shortened as shown in the drawing.

Further, as shown in FIG. 18, the shape of the thrust washer 27 may be also changed. The lower surface of the thrust washer 27 shown in FIG. 18 is provided with a boss portion 27a. By inserting the boss portion 27a into the support hole 51c of the driven gear 51 and inserting the driven shaft 13 into the inner peripheral side of the boss portion 27a, the external force applied to the driven shaft 13 in the inclining direction of the driven gear 51 may be received by the thrust washer 27, so that the operation of the impact absorbing mechanism 50 can be made stable.

The above-described embodiments may be further modified into various forms. For example, although a configuration has been exemplified in which the axial elastic members 23, 43, and 55 are formed of elastics, other members such as compressive coil springs or disc springs may be used.

Further, although the gear trains for speed reduction of the disk grinder 1 have been exemplified as gear trains, the present invention can be applied to impact absorbing mechanisms of gear trains of the other electric tools, such as a screw tightening machine, an electric drill for forming holes, or a cutting machine such as a circular table saw may be possible. Furthermore, the invention is not limited to electric tools but may also be applied to impact absorbing mechanisms of gear trains of various machines and instruments.

The invention claimed is:

1. An impact absorbing mechanism of a gear train that transmits the rotational power of a driving shaft to a driven shaft, wherein the gear train includes a drive gear on the side of the driving shaft and a driven gear on the side of the driven shaft, which mesh with each other, wherein, in a rotational power transmission path between the driven gear and the driven shaft, there is provided a radial displacement member that is supported by the driven gear so as to be displaceable in a radial direction, an axial displacement member that displaces in an axial direction by the displacement of the radial displacement member in a diameter expanding direction, and an axial elastic member that performs an impact absorbing action with respect to the displacement of the axial displacement member in the axial direction, and wherein the axial displacement member is displaced in the axial direction by the rotation of the driven gear relative to the driven shaft, so that impact generated upon meshing between the drive gear and the driven gear is absorbed.

2. The impact absorbing mechanism according to claim 1, wherein the radial displacement member is engaged with a first inclined surface provided on the driven shaft and a second inclined surface provided on the axial displacement member, so that the radial displacement member is displaced in the radial direction by the displacement of the radial displacement member about the axis relative to the first inclined surface in association with rotation of the driven gear relative to the driven shaft, and the axial displacement member is displaced in the axial direction by the radial displacement of the radial displacement member relative to the second inclined surface in association with the radial displacement.

3. The impact absorbing mechanism according to claim 2, wherein a steel ball supported by the driven gear so as to be displaceable in the radial direction is provided as the radial displacement member, and the steel ball is held between the first inclined surface and the second inclined surface, so that the steel ball is displaced in the radial direction by the rotation of the driven gear relative to the driven shaft; and the axial displacement member is displaced in the axial direction.

4. The impact absorbing mechanism according to claim 3, wherein an intermediate roller is interposed between the steel ball and the first inclined surface so as to engage with the first inclined surface in a line-contact relationship therewith, so that the steel ball indirectly engages with the first inclined surface, and the steel ball is displaced in the radial direction by the radial displacement of the intermediate roller, so that the axial displacement member is displaced in the axial direction.

5. The impact absorbing mechanism according to claim 1, wherein the driven gear is biased in a direction, in which the drive gear meshes deeper with the driven gear, by a biasing force of the axial elastic member applied via the axial displacement member.

6. The impact absorbing mechanism according to claim 1, wherein a single elastic member having an annular shape is used as the axial elastic member.

7. A disk grinder comprising the impact absorbing mechanism according to claim 1, wherein the drive gear rotated by an electric motor, a bevel gear that serves as the driven gear with which the drive gear meshes, and a spindle that serves as the driven shaft and supporting the bevel gear, wherein a circular whetstone is provided on the spindle, a steel ball serving as the radial displacement member is interposed in the rotational power transmission path between the bevel gear and the spindle, so that the axial elastic member operates with respect to the axial displacement of the axial displacement member associated with the displacement of the steel ball in the diameter expanding direction, thereby absorbing impact generated upon meshing between the drive gear and the bevel gear when starting or stopping the electric motor.

8. An impact absorbing mechanism of a gear train that transmits rotational power of a driving shaft to a driven shaft, wherein the gear train includes a drive gear on the side of the driving shaft and a driven gear on the side of the driven shaft, which mesh with each other, wherein, in a rotational power transmission path between the driven gear and the driven shaft, there is provided a radial displacement member that is supported by the driven gear so as to be displaceable in a radial direction, and a radial elastic member that performs an impact absorbing action with respect to the displacement of the radial displacement member in the diameter expanding direction, wherein the radial displacement member is displaced in the diameter expanding direction by the rotation of the driven gear relative to the driven shaft, so that impact generated upon meshing between the drive gear and the driven gear is absorbed.

9. The impact absorbing mechanism according to claim 8, wherein an inclined surface is provided on the side of the driven gear or the side of the driven shaft, and the radial displacement member is engaged with the inclined surface so that the radial displacement member is displaced in the diameter expanding direction by the rotation of the driven gear relative to the driven shaft.

10. The impact absorbing mechanism according to claim 9, wherein a roller serving as the radial displacement member is engaged with the inclined surface on the side of the driven shaft, and a C-shaped radial elastic member is displaced in the diameter expanding direction with respect to the displacement of the roller in the diameter expanding direction so as to perform an impact absorbing action.

11. A disk grinder with the impact absorbing mechanism according to claim 8, comprising the drive gear rotated by an electric motor, a bevel gear that serves as the driven gear with which the drive gear meshes, and a spindle serving as the driven shaft and supporting the bevel gear, wherein a circular whetstone is provided on the spindle, a roller serving as the radial displacement member is interposed in the rotational power transmission path between the bevel gear and the spindle, so that the radial elastic member is operated with respect to the displacement of the roller in the diameter expanding direction, thereby absorbing impact generated upon meshing between the drive gear and the bevel gear when starting or stopping the electric motor.

* * * * *